Sept. 7, 1965 S. D. SUMERFORD ETAL 3,205,244
CATALYTIC SYNTHESIS OF CARBOXYLIC ACIDS FROM
OLEFINS, CARBON MONOXIDE AND WATER
Filed Dec. 28, 1962
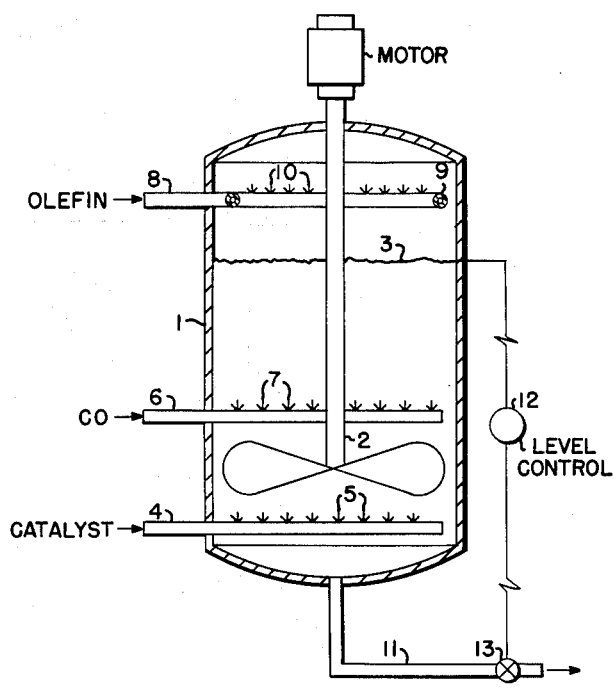
Simpson D. Sumerford
Henry G. Ellert          Inventors
Raymond C. Lohman
By
Patent Attorney

United States Patent Office 3,205,244
Patented Sept. 7, 1965

3,205,244
IMPROVED CATALYTIC SYNTHESIS OF CARBOXYLIC ACIDS FROM OLEFINS, CARBON MONOXIDE AND WATER
Simpson Douglas Sumerford, Henry George Ellert, and Raymond Carroll Lohman, Baton Rouge, La., assignors to Esso Research and Engineering Company, a corporation of Delaware
Filed Dec. 28, 1962, Ser. No. 247,899
3 Claims. (Cl. 260—413)

This invention concerns the production of carboxylic acid by the reaction of carbon monoxide, olefinic compounds, and water using a liquid, highly acidic inorganic acid catalyst.

It has been known that carboxylic acids may be synthesized by the reaction of water, carbon monoxide and olefins using an inorganic acid catalyst such as hydrated boron fluoride. One of the practical problems encountered in conducting this synthesis is the unavoidable formation of undesired by-products and particularly the production of olefin polymers. This results from the circumstance that the highly acidic catalyst employed is a very active polymerization catalyst. The present invention is an improvement of this acid synthesis process in which undesired by-products are minimized by maintaining low olefin concentrations in the reactant mixture, preferably below 2 weight percent, and by avoiding any localized concentration of the olefins. In the preferred embodiment of the this invention, this is accomplished by introducing the olefinic feed material into a carbon-monoxide rich vapor space above the liquid inorganic acid catalyst while maintaining the rate of olefin introduction at or below the rate of olefin conversion. The introduction of the olefin in the carbon monoxide vapor space in this manner enables the olefin to be well mixed with carbon monoxide prior to contact with the acid catalyst and permits the carboxylic acid synthesis to initiate at the top surface of the acid catalyst in a manner avoiding any localized concentration of olefins, thereby minimizing by-product formation.

The acidic catalyst employed in the practice of the invention is any of the liquid, highly acidic catalysts which are known to promote the reaction of carbon monoxide, olefins and water. Such catalysts include concentrated sulfuric acid, phosphoric acid and hydrofluoric acid. However, the catalyst which is preferably employed in the present invention is boron fluoride combined with water in molar ratios of at least 1:1 and preferably about 2 to 2.5:1. Boron fluoride combines or complexes with water so as to form definite chemical compounds corresponding to the empirical formula of boron fluoride monohydrate and boron fluoride dihydrate, both of which may include additional quantities of water which may be present as a solvent or may, in fact, complex with the boron fluoride in other ratios. Such catalysts are referred to herein as "hydrated boron fluoride catalysts." While greater quantities of water may be employed, if desired, it is particularly preferred in the practice of this invention to use a boron fluoride catalyst containing about 1 to 2.5 mols of water per mol of boron fluoride, and particularly, a catalyst containing about 2 mols of water per mol of boron fluoride. Optionally, the hydrated boron fluoride catalyst may be used in combination with other of the inorganic acid catalyst. Sulfuric acid or phosphoric acid, in particular, may usefully be employed with the hydrated boron fluoride catalyst. The relative proportions of the acids employed may be varied, although use of approximately equal molar amounts of boron fluoride and phosphoric acid or sulfuric acid is preferred.

The process of this invention may be used for the preparation of carboxylic acids from any monoolefinic compound containing 3–20 carbon atoms. The olefin feed stock can comprise straight or branched chain alkenes including propylene, butylene, pentene, and the higher homologues and isomers of these alkenes. The olefins of this class can constitute either terminal or internal unsaturated alkenes. Similarly, cyclic olefins having up to 20 carbon atoms may be employed as the feed stock, including cyclopentene, cyclohexene, and the higher homologues. Any desired mixtures of these compounds such as the $C_4$ fraction recovered in petroleum refining operations may be used if desired. All of these monoolefinic compounds can include functional groups such as carboxylic acid (carboxyl) or alcohol (hydroxyl) groups. Thus the $C_3$ to $C_{20}$ monoolefinic compound can be one selected from the group consisting of unsubstituted $C_3$ to $C_{20}$ monoolefinic hydrocarbons and substituted $C_3$ to $C_{20}$ monoolefinic hydrocarbons wherein the substituent is a functional group selected from the group consisting of carboxylic acid and alcohol groups.

The acid synthesis process may be conducted at temperatures within the range of about $-20°$ C. up to $150°$ C., although the preferred temperature is in the range of $20$–$100°$ C. Elevated pressures are required in order to maintain a high carbon monoxide partial pressure. Pressures of 10 to 600 atmospheres or more can be employed, although it is preferred to use a pressure of about 40 to 100 atmospheres.

The process may be conducted in either a semi-batch or continuous fashion. In a semi-batch process the liquid, inorganic acid catalyst is first introduced to a suitable reactor or autoclave and thereafter carbon monoxide and olefin are introduced to the reactor continuously until the catalyst is exhausted. In continuous processing, a similar reactor and procedure can be employed, but with the continuous withdrawal of reactant products and the continuous introduction of fresh or recycle catalyst. However conducted, it is the particular feature of this invention that the reaction is carried out in such a manner that the olefin concentration in the reactant mixture is maintained below at least 5 weight percent and preferably below 2 weight percent at all times.

In order to accomplish this, it is necessary to add the olefinic feed to the reactant mixture at a rate no greater than the rate of olefin conversion. The reaction of the olefin, carbon monoxide and catalyst occurs readily to form a complex of these reactants so that 90% olefin conversion can be obtained in about twenty minutes. However, extended reaction periods of at least one hour and preferably two to four hours are required to attain the maximum practicable olefin conversion. In a lined-out continuous reaction, unreacted olefin content of the reactor effluent may be analytically determined by gas chromatography. The feed introduction rate, temperature and the holding time may be controlled to maintain the unreacted olefin concentration below about 5 weight percent and preferably less than 2 weight percent based on crude acid product.

The reaction of the carbon monoxide in this manner results in the formation of a complex which can be decomposed by hydrolysis to release the carboxylic acid product. The carboxylic acid will correspond to an acid produced by removing an olefinic linkage of the olefinic feed stock and attaching a carboxylic group directly to one, and a hydrogen atom to the other, of the two olefinic carbon atoms. Thereby olefins are converted to a carboxylic acid having one additional carbon atom. Similarly, application of the process to an olefinically unsaturated acid results in production of dicarboxylic acid having one more carbon atom in the molecule.

A suitable apparatus for carrying out the process of this invention is illustrated in the accompanying drawing.

Referring to this drawing, the numeral 1 designates the reactor vessel or autoclave. The reactor is provided with stirring or agitating means 2, so as to enable conduct of the reaction in a well mixed, homogeneous manner. Heating coils, which are not illustrated, are provided to maintain the desired reaction temperatures. A body of liquid inorganic acid catalyst, having a level indicated at 3, is maintained in the reactor. The catalyst may be introduced through a catalyst inlet line leading into any desired part of the reactor and either in the vapor space or below the interface 3. As illustrated, catalyst can be introduced through line 4 which may be provided with a distribution manifold and perforations or nozzles 5. Similarly, carbon monoxide may be introduced to the reactor through an inlet line at any desired part of the reactor. As illustrated, carbon monoxide is introduced through line 6, and released within the reactor through nozzles 7 beneath the upper surface of the liquid catalyst. It is an essential feature of this invention, however, that the olefin feed stock must be introduced in the vapor space of Reactor 1 above the liquid interface 3. In the attached drawing, the liquid olefin feed stock is pumped into the reactor through line 8, connecting to a circular distributor 9 which is perforated or equipped with nozzles 10 to permit the olefin to stream into the reactor as a multiplicity of fine liquid streams or sprays.

As indicated, the process of this invention can be conducted in either a semi-batch or continuous manner. If operated as a semi-batch process, the catalyst is first introduced to the reactor and thereafter the carbon monoxide and olefin are continuously introduced while maintaining the olefin introduction at a relatively slow rate, not greater than the rate of olefin conversion. Alternately, Reactor 1 may be operated on a continuous basis by the continuous withdrawal of reactant product through line 11. If desired, a level control 12 may be used to operate withdrawal valve 13 so as to control continuous withdrawal with maintenance of the liquid surface at the level 3. In operating the process on a continuous basis in accordance with this invention, withdrawal of products from the reactor must be carried out at a relatively slow rate to insure complete conversion of the olefin feed and thereby to maintain unreacted olefin concentration below 2 weight percent. A holding time of at least one hour is required, and two to four hours is preferred.

The effluent from the reactor may be analyzed to determine the proportion of unreacted olefin, or samples can be withdrawn periodically for analysis if a batch process is used. Such analyses can be used to establish operating conditions definitive of feed introduction rates which will insure substantially complete conversion of the olefins and maintenance of the unreacted olefin concentration at low levels. In accordance with this invention, the reaction is carried out so that the unreacted olefin concentration will not exceed 5 percent by weight, and preferably will be less than 2 weight percent based on crude acid product at all times.

The reaction products may be removed from Reactor 1 for workup of the finished carboxylic acid in the conventional manner. Thus, the products of the reactor may be removed and introduced to a hydrolysis zone wherein the products are contacted with water to free the carboxylic acid product. At least one mol of water is required per mol of olefin reactant. The carboxylic acids resulting from hydrolysis may be separated from the inorganic acid catalyst and any excess water by simple phase separation. The carboxylic acid product may then be purified by conventional distillation or fractionation procedures.

In order to illustrate this invention and to demonstrate the advantages of the invention, a series of carboxylic acid syntheses were carried out in which varied levels of olefin concentration were maintained in the reactants. The olefin feed stock constituted a $C_9$ olefin stream, a propylene trimer, having the following composition: $C_9$ olefins, 90%; $C_8$ olefins, 6%; and $C_{10}$ olefins, 4%.

The acid catalyst employed was a hydrated boron fluoride catalyst corresponding to the dihydrate of boron fluoride. The reaction was carried out in a continuous flow reactor by continuous introduction of catalyst, carbon monoxide and olefin to a well mixed reactor which was partially filled with the liquid catalyst and products. Product was continuously withdrawn from the reactor. At all times the carbon monoxide pressure was maintained at about 800–900 p.s.i., and the temperature within the reactor was maintained at about 125° F. In each run the rate of introduction of the propylene trimer was varied from a level somewhat below the reaction rate of the olefin to a rate of introduction greater than the rate at which the olefin was reacting. The unreacted olefin concentration was analyzed in the reactor effluent during the course of the reaction. The reaction products were then hydrolyzed at about 100° F. with a molar excess of water based on the olefin-carbon monoxide-acid catalyst complex, and the liberated carboxylic acid product was distilled in a one-inch Oldershaw column. The following results were obtained:

*Table I*

| $C_9$ olefin concentration remaining, percent of crude acid | Distilled $C_{10}$ acid product purity percent of theoretical |
|---|---|
| 0.8 | 100 |
| 2.0 | 99.9 |
| 5.2 | 97.7 |
| 7.4 | 96.5 |

It will be noted from this data that when the olefin feed was introduced at a rate such that substantially complete olefin reaction was obtained, high purity carboxylic acid product was produced. Thus, the final acid product was found to have a purity of substantially 100° of theoretical in the runs in which the olefin feed introduction was sufficiently slow so that less than about 2 weight percent of unreacted olefins remained in the reactant mixture. On the other hand, at higher olefin feed rates, resulting in higher concentration of unreacted olefins in the reactant mixture, by-product impurities resulted which could not be separated from the carboxylic acid product by fractionation. This results from the circumstance that such by-products may have approximately the same boiling point as the desired carboxylic acid product.

In a second series of experiments, isobutylene was reacted with carbon monoxide and boron fluoride dihydrate catalyst in a semi-batch manner to produce pivalic acid. As shown in Table II below, two series of runs were carried out, maintaining a carbon monoxide pressure of 1500 p.s.i. and a temperature of 125° F. in one series; and in a second series of experiments, a carbon monoxide pressure of 500 p.s.i. and a temperature of 65° F. Under each of these reaction conditions, the isobutylene feed rate was maintained both below and above the isobutylene conversion rate. The data obtained is shown in Table II.

*Table II*

| Isobutylene feed rate, cc./min. | Pivalic acid yield, mol. percent | Reaction conditions | |
|---|---|---|---|
| | | CO pressure p.s.i.g. | Temperature, ° F. |
| 2.14 | 73.9 | 1,500 | 125 |
| 6.25 | 62.4 | 1,500 | 125 |
| 1.96 | 51.4 | 500 | 65 |
| 5.50 | 47.8 | 500 | 65 |

It will be noted that at the high rates of isobutylene feed introduction in both cases, relatively low yields of pivalic acid were obtained as compared to the slow introduction of the isobutylene feed. Thus, for example, when isobutylene was introduced at a rate of 2.14 cc./min., that is, at a rate below the rate of conversion of the isobutylene, an acid yield of 73.9 mol percent was obtained. However, when the isobutylene was introduced at the rate of 6.25 cc./min., a rate faster than the rate of isobutylene conversion, the acid yield was only 62.4 mol percent.

Additional experiments were conducted in a continuous, stirred reactor in which propylene trimer was introduced continuously, and product was removed from the reactor continuously so as to maintain varying holding times of the reactants in the reactor. In a first series of experiments conducted at 125° F., the $C_9$ olefin was introduced to the reactor and product removed so as to establish a reaction time of one hour. This rate of olefin introduction in conjunction with the reaction time was inadequate to permit complete reaction of the olefin, with the consequence that the $C_{10}$ acid product was obtained in a mol percent yield of only 84.7% having a purity of 97.7. As compared to this, when the olefin was continuously introduced at a relatively slow rate with continuous withdrawal of products so as to establish a reaction time of 3 hours, an acid yield of 92.0 mol percent was obtained having an acid purity of 100%. Similar comparative results are also illustrated in Table III for runs carried out at 150° F.

*Table III*

| $C_9$ olefin reaction time, hrs. | Unreacted olefin concentration, wt. percent | $C_{10}$ acid yield, mol percent | $C_{10}$ acid purity, percent [1] (by acid No.) | CO pressure, p.s.i.g. | Temperature, ° F. |
| --- | --- | --- | --- | --- | --- |
| 3.0 | 1.0 | 92.0 | 100 | 800 | 125 |
| 1.0 | 5.2 | 84.7 | 97.7 | 805 | 125 |
| 3.83 | 1.6 | 83.5 | 100 | 860 | 150 |
| 1.10 | 7.4 | 82.8 | 96.5 | 800 | 150 |

[1] Purity of the distilled acid product.

In each of the experiments reported above, olefin was introduced to the reactors employed in the vapor space above the liquid catalyst. The criticality of this feature of the invention is illustrated by a number of comparative runs in which the olefin was added above and below the catalyst surface. The experiments were carried out in a stirred autoclave to which boron fluoride dihydrate catalyst was first charged. The pressure was then raised to 1500 p.s.i. by introducing carbon monoxide into the autoclave and isobutylene was subsequently introduced to the autoclave at the rate of about 2½ cc./min. Temperature was maintained in the range of 70–75° F. during these runs. The results obtained while adding the reactants to the autoclave in different manners are shown in Table IV.

*Table IV*

| | 1 | 2 | 3 | 4 | 5 |
| --- | --- | --- | --- | --- | --- |
| Temperature, ° F. | 70–75 | 70–75 | 70–75 | 70–75 | 70–75 |
| CO pressure, p.s.i.g. | 1500–1600 | 1500–1600 | 1500–1600 | 1500–1600 | 1500–1600 |
| i-$C_4H_8$ added to vapor | Yes | Yes | | | |
| i-$C_4H_8$ added below catalyst | | | Yes | Yes | Yes |
| CO, CF/H added below catalyst | | | 0 | 1.5 | 15.9 |
| $BF_3.2H_2O$/i-$C_4H_8$ mole ratio | 1.07 | 1.07 | 1.07 | 1.07 | 1.07 |
| Percent unreacted i-$C_4H_8$ | 0 | 0 | 0 | 0 | 0 |
| Yields, mole percent by gas chromatography: | | | | | |
| Esters and lighter | 5.2 | 10.4 | | 9.6 | 9.4 |
| Pivalic acid | 71.0 | 72.6 | | 22.2 | 32.0 |
| Higher acids and bottoms | 23.8 | 17.0 | | 68.2 | 58.6 |

Referring to Runs 1 and 2, the isobutylene was added to the reactor in accordance with this invention in the carbon monoxide vapor space, above the liquid catalyst surface. Yields of the pivalic acid product of 71.0 and 72.6% were obtained in both runs. In Run 3, the isobutylene feed was pumped through a distributor ring below the surface of the catalyst. In this case, a polymeric product was obtained from which it was impracticable to recover the pivalic acid. Finally in Runs 4 and 5, isobutylene was premixed with carbon monoxide and introduced through a distributor ring below the surface of the catalyst. In these runs, while substantial by-product formation occurred, it was possible to recover pivalic acid product in yields of 22.2 and 32.0 mol percent respectively. It will be noted that this data shows that undesired by-product formation can be minimized somewhat by premixing olefin feed and carbon monoxide when the olefin feed is introduced into the liquid catalyst. However, much better yields of acid are obtainable by introducing the olefin feed to the vapor space above the catalyst in accordance with this invention.

What is claimed is:

1. In a two-step process for synthesizing carboxlic acids involving (1) a first step reaction of (A) carbon monoxide, (B) a $C_3$ to $C_{20}$ monoolefinic compound selected from the group consisting of unsubstituted $C_3$ to $C_{20}$ monoolefin hydrocarbons and substituted $C_3$ to $C_{20}$ monoolefin hydrocarbons wherein the substituent is a functional group selected from the group consisting of carboxyl and hydroxyl groups and (C) a liquid, hydrated boron fluoride catalyst to form a complex of these reactants, and (2) a second step hydrolysis of said complex to form carboxylic acid product, the improvement which comprises carrying out the formation of said complex at a temperature of about −20° C. to 150° C. while maintaining a carbon monoxide pressure of about 10 to 600 atmospheres in a carbon monoxide rich vapor space above a body of said liquid catalyst and feeding said $C_3$ to $C_{20}$ monoolefinic compound into said carbon monoxide rich vapor space above said body of liquid catalyst at a feed rate sufficiently slow to establish a holding time of at least one hour while maintaining the concentration of unreacted $C_3$ to $C_{20}$ monoolefinic compound in the reactant mixture at below 5 wt. percent based on crude acid product.

2. A process according to claim 1 wherein said $C_3$ to $C_{20}$ monoolefinic compound is continuously fed at a feed rate sufficiently slow to establish a holding time of at least two hours.

3. A process according to claim 2 wherein said $C_3$ to $C_{20}$ monoolefinic compound is an unsubstituted $C_3$ to $C_{20}$ monoolefinic hydrocarbon and the concentration of said unreacted monoolefinic compound is maintained at below 2 wt. percent.

References Cited by the Examiner

UNITED STATES PATENTS

| | | | |
|---|---|---|---|
| 2,135,459 | 11/38 | Loder | 260—533 |
| 3,059,004 | 10/62 | Waale et al. | 260—533 |
| 3,059,006 | 10/62 | Van De Vusse | 260—533 |

FOREIGN PATENTS 883,142  11/61  Great Britain.

LORRAINE A. WEINBERGER, *Primary Examiner.*

LEON ZITVER, *Examiner.*